United States Patent
Gerwe et al.

(10) Patent No.: US 12,018,983 B2
(45) Date of Patent: Jun. 25, 2024

(54) COMBINED MULTI-SPECTRAL AND POLARIZATION SENSOR

(71) Applicant: The Boeing Company, Chicago, IL (US)

(72) Inventors: David Roderick Gerwe, West Hills, CA (US); Paul S. Idell, Thousand Oaks, CA (US); Kevin Ray Paxton, North Tustin, CA (US); Friedrich W. Kunzler, Hacienda Heights, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 18/306,151

(22) Filed: Apr. 24, 2023

(65) Prior Publication Data

US 2023/0266165 A1     Aug. 24, 2023

Related U.S. Application Data

(63) Continuation of application No. 17/554,781, filed on Dec. 17, 2021, now Pat. No. 11,635,328.

(Continued)

(51) Int. Cl.
*G01J 3/02*       (2006.01)
*G01J 3/28*       (2006.01)
(Continued)

(52) U.S. Cl.
CPC .......... *G01J 3/0224* (2013.01); *G01J 3/2803* (2013.01); *G01J 4/04* (2013.01); *G02B 5/30* (2013.01);
(Continued)

(58) Field of Classification Search
CPC .......... G01J 3/0224; G01J 3/2803; G01J 4/04; G01J 2003/2826; G01J 3/2823;
(Continued)

(56) References Cited

U.S. PATENT DOCUMENTS 7,420,678 B2   9/2008  Lundgren et al.
9,052,454 B2   6/2015  Vincent et al.
(Continued)

OTHER PUBLICATIONS

Diner et al: "Airborne Multiangle SpectroPolarimetric Imager (AirMSPI) observations over California during NASA's Polarimeter Definition Experiment (PODEX)", Algorithms and Technologies for Multispectral, Hyperspectral, and Ultraspectral Imagery XIX—Proceedings of SPIE, vol. 8873, Sep. 27, 2013, pp. 88730B-1-88730-B10, XP055917177, US ISSN: 0277-786X, DOI: 10.1117/12.2024605, ISBN: 978-1-5106-4548-6.
(Continued)

*Primary Examiner* — Abdullahi Nur
(74) *Attorney, Agent, or Firm* — Haynes and Boone, LLP

(57) ABSTRACT

A combined multi-spectral and polarization (CMSP) sensor is disclosed that enhances contrast-to-noise ratio (CNR). The CMSP sensor comprises a multi-spectral and polarization (MSP) filter, a single focal plane array (FPA), and a controller. The FPA comprises a plurality of detectors and the MSP filter comprises at least a first bandpass filter having a first frequency range and a second bandpass filter having a second frequency range that is distinct from the first frequency range and a first polarization filter having a first polarization value and a second polarization filter having a second polarization value that is distinct from the first polarization value.

20 Claims, 8 Drawing Sheets

Related U.S. Application Data

(60) Provisional application No. 63/128,004, filed on Dec. 19, 2020.

(51) Int. Cl.
*G01J 4/04* (2006.01)
*G02B 5/30* (2006.01)
*H04N 23/11* (2023.01)

(52) U.S. Cl.
CPC ...... *H04N 23/11* (2023.01); *G01J 2003/2826* (2013.01)

(58) Field of Classification Search
CPC ........ G01J 2003/1213; G01J 3/06; G01J 3/32; G01J 2003/2806; G01J 3/0205; G01J 3/447; G02B 5/30; H04N 23/11
See application file for complete search history.

(56) References Cited

U.S. PATENT DOCUMENTS

| | | | |
|---|---|---|---|
| 9,464,938 B2 | 10/2016 | Tillotson et al. | |
| 9,846,921 B2 | 12/2017 | Spinelli et al. | |
| 9,918,050 B2 | 3/2018 | Tillotson | |
| 10,366,501 B2 | 7/2019 | Ray et al. | |
| 10,410,371 B2 | 9/2019 | Lee et al. | |
| 10,453,187 B2 | 10/2019 | Peterson et al. | |
| 10,466,036 B2 | 11/2019 | Pau | |
| 2013/0016254 A1* | 1/2013 | van Hoorebeke | H04N 23/10 348/239 |
| 2013/0141420 A1 | 6/2013 | Erignac | |
| 2016/0273963 A1* | 9/2016 | Herrick | G01J 3/0224 |
| 2018/0184015 A1 | 6/2018 | Richarte et al. | |
| 2020/0066782 A1 | 2/2020 | Beirret et al. | |

OTHER PUBLICATIONS

Jovanovic et al: "Automated Data Production for a Novel Airborne Multiangle Spectropolarimetric Imager (AIRMSPI)", The International Archives of the Photogrammetry, Remote Sensing and Spatial Information Sciences, vol. XXXIX-BI, 2012 XXII ISPRS Congress, Aug. 25-Sep. 1, 2012, Melbourne, Australia, pp. 33-38, XP055917396, DOI: 10.5194/isprsarchives-XXXIX-BI-33-2012.

* cited by examiner

COMBINED MULTI-SPECTRAL AND POLARIZATION SENSOR

CROSS-REFERENCE TO RELATED APPLICATION

This application is a continuation of U.S. patent application Ser. No. 17/554,781, filed Dec. 17, 2021, which is incorporated by reference herein in its entirety and claims priority to U.S. Provisional Patent Application No. 63/128,004 filed Dec. 19, 2020, and entitled "Combined Multi-Spectral and Polarization Sensor," which is incorporated by reference herein in its entirety.

FIELD

The present disclosure is related to imaging systems, and more particularly to multi-spectral imaging systems.

BACKGROUND

Imaging systems utilizing electro-optical sensors can be used to determine one or more characteristics of an object where the electro-optical sensors receive electromagnetic radiation signals from the objects or reflected off of the objects. Multi-spectral sensors are electro-optical sensors that capture images of the electromagnetic radiation at many wavelengths. These multi-spectral sensors may utilize several different cameras to capture images at red, green, blue, and in-between color wavelengths and also images at ultraviolet (UV) and various infrared (IR) wavelengths. In general, the use of these types of multi-spectral sensors in multi-spectral imaging is useful for many things including: terrain classification; detecting specific materials (minerals, paints, metals, vehicles, roads, building materials, oil spills, soil types, etc.); and characterizing atmosphere, clouds, weather, climate.

In order to improve these types of imaging sensors, polarization sensors have also been included in the imaging sensors. Polarization imaging utilizes a polarization sensor to divide up the received light in a captured image into different planes of polarization, for example, vertical, horizontal, and 45-degree polarization channels, or more. Since man-made materials tend to polarize light much more strongly than natural material, appropriate processing of these polarization channels can produce a degree-of-linear-polarization (DOLP) image that results in the man-made objects "popping out" against the clutter background in the captured image.

Unfortunately, known types of imaging sensors utilizing both multi-spectral sensors and polarization sensors are complex and require separate cameras and one or more optical beam splitters that divide the captured image light from the collecting optics (i.e., a telescope) into the different spectral bands and polarization channels. In an example of operation, one portion of the collected image light is directed through the focusing optics to a first camera acting as a multi-spectral imaging sensor and the other portion of the collected image light is directed to another camera acting as a polarization imaging sensor. In this example, each camera is implemented as a focal plane array (FPA) and these known imaging systems utilize complex optics and at least two FPAs.

As such, there is a need for a new type of imaging sensor that provides both multi-spectral imaging and polarization imaging without the optics complexity and need for multiple FPAs.

SUMMARY

A combined multi-spectral and polarization (CMSP) sensor is disclosed. The CMSP sensor comprises a multi-spectral and polarization (MSP) filter, a single focal plane array (FPA), and a controller. The FPA comprises a plurality of detectors and the MSP filter comprises at least a first bandpass filter having a first frequency range and a second bandpass filter having a second frequency range that is distinct from the first frequency range and a first polarization filter having a first polarization state and a second polarization filter having a second polarization state that is distinct from the first polarization state. The controller is in signal communication with the MSP filter and the single FPA and is configured to: initiate capture of a first image of a scene while a particular portion of the scene has a first alignment with a first detector of the single FPA and the first bandpass filter is between the particular portion of the scene and the first detector, where the first image (806) is registered; in response to determining that the particular portion of the scene has a second alignment with a second detector of the single FPA, the second alignment substantially matching the first alignment, and that the second bandpass filter is between the particular portion of the scene and the second detector, initiate storage of a second image of the scene, the second image captured while the particular portion of the scene has the second alignment with the second detector, where the second image is registered; in response to determining that the particular portion of the scene has a third alignment with a third detector of the single FPA, the third alignment substantially matching the first alignment, and that the first polarization filter is between the particular portion of the scene and the third detector, initiate storage of a third image of the scene, the third image captured while the particular portion of the scene has the third alignment with the third detector, where the third image is registered; and generate a multi-spectral and polarization composite image using at least the first image, the second image, and third image, where the first image, the second image, and third image are co-added to build the multi-spectral and polarization composite image as a hypercube image, wherein co-adding the first image, the second image, and third image increases a contrast-to-noise ratio (CNR) of the multi-spectral and polarization composite image.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
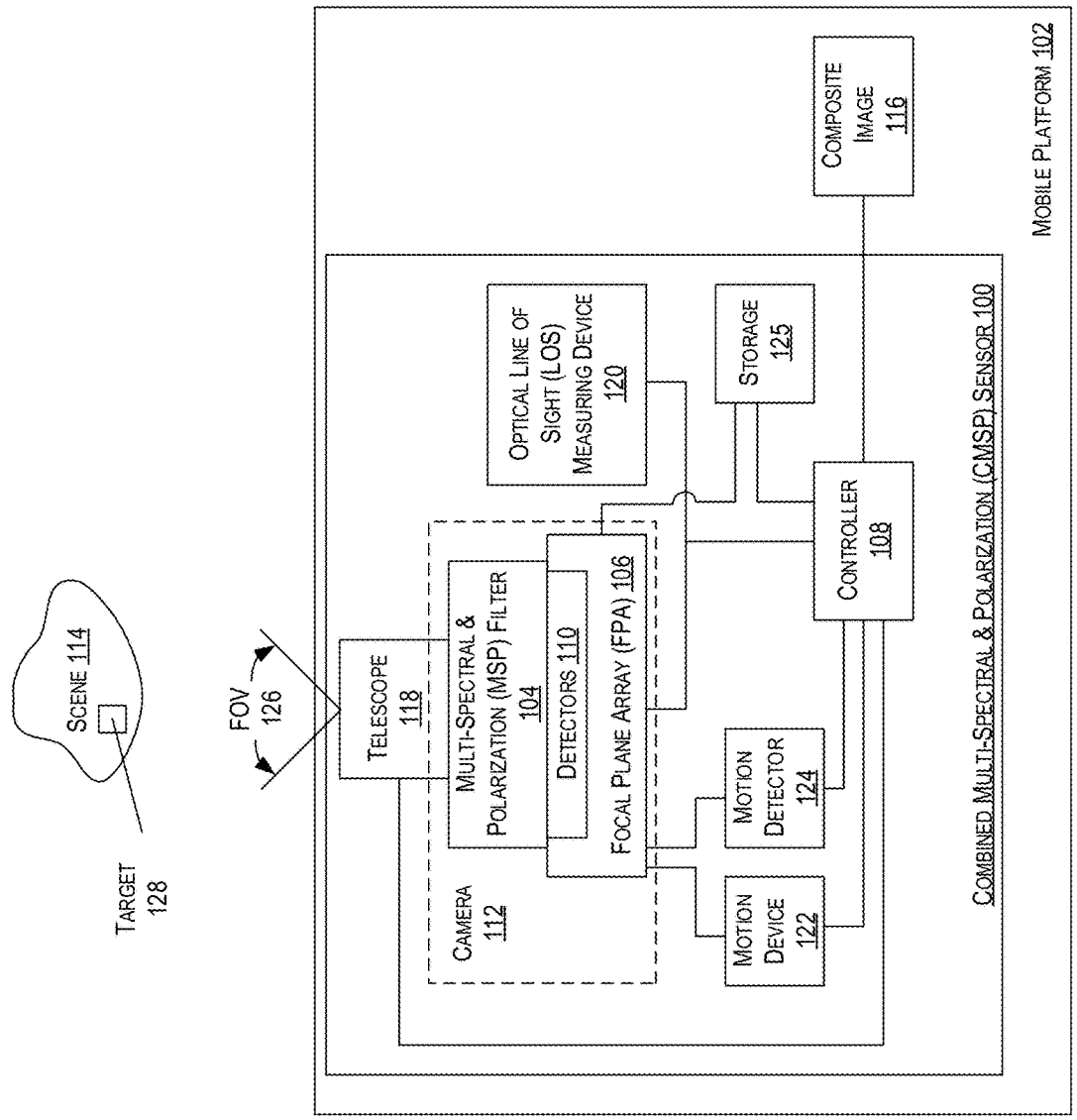
FIG. 1 is a system block diagram of an example of an implementation of a combined multi-spectral and polarization (CMSP) sensor in accordance with the present disclosure.

Disclosed is a combined multi-spectral and polarization (CMSP) sensor. The CMSP sensor enhances contrast-to-noise ratio (CNR) of acquired images of a scene. The CMSP sensor comprises a multi-spectral and polarization (MSP) filter, a single focal plane array (FPA), and a controller. The FPA comprises a plurality of detectors and the MSP filter comprises at least a first bandpass filter having a first frequency range and a second bandpass filter having a second frequency range that is distinct from the first frequency range and a first polarization filter having a first polarization state and a second polarization filter having a second polarization state that is distinct from the first polarization state. The controller is in signal communication with the MSP filter and the single FPA and is configured to: initiate capture of a first image of a scene while a particular portion of the scene has a first alignment with a first detector of the single FPA and the first bandpass filter is between the particular portion of the scene and the first detector, where the first image is registered; in response to determining that the particular portion of the scene has a second alignment with a second detector of the single FPA, the second alignment substantially matching the first alignment, and that the second bandpass filter is between the particular portion of the scene and the second detector, initiate storage of a second image of the scene, the second image captured while the particular portion of the scene has the second alignment with the second detector, where the second image is registered; in response to determining that the particular portion of the scene has a third alignment with a third detector of the single FPA, the third alignment substantially matching the first alignment, and that the first polarization filter is between the particular portion of the scene and the third detector, initiate storage of a third image of the scene, the third image captured while the particular portion of the scene has the third alignment with the third detector, where the third image is registered; and generate a multi-spectral and polarization composite image using at least the first image, the second image, and third image, where the first image, the second image, and third image are co-added to build the multi-spectral and polarization composite image as a hypercube image, wherein co-adding the first image, the second image, and third image increases a contrast-to-noise ratio (CNR) of the multi-spectral and polarization composite image.

In general, the CMSP sensor overlays a single FPA of a camera with the MSP filter that includes a series of spectral filters and polarization filters. The single FPA is generally of a large pixel format that is overlaid with the polarization filters and a series of spectral filters that span a major band of spectral frequencies such as, for example, VNIR+SWIR, MWIR, or LWIR.

The polarization filters may include orthogonal or incrementally varying polarization filter bands that vary from such as, for example, −90 degrees to 90 degrees. The polarization filters add additional modes for discriminating targets in a scene from background noise because polarization at visual, MWIR, and LWIR wavelengths provide a strong discriminate for detecting man-made objects in the clutter of natural backgrounds in a scene. As an example, measurements of various painted boards within a scene that are oriented with normal 45 degrees from the line of sight (LOS) from the CMSP sensor have produced degree of linear polarization (DOLP) strengths equivalent to differences of 2 to 6 Kelvin. As such, adding various polarization filters to MSP filter enables the CMSP sensor to perform DOLP measurements adding a complementary sensing mode for detecting targets in the scene being scanned by the CMSP sensor.

Utilizing the CMSP sensor, a spectral image cube may be formed by scanning the field of view (FOV) across a ground swath on a landmass while the CMSP sensor collects a series of image frames of multiple scenes of the landmass along the ground swath. An inertial measurement unit (IMU) sensor on the CMSP sensor provides precise pointing information enabling the real-time on-board sub-pixel alignment of the captured image frames of the multiple scenes and co-additions (stacking) of the image frames. This process is generally a digital domain Time Delay and Integration (TDI) process. As an alternative or augmentation to the IMU sensor, well established registration processing can also determine the alignment of capture frames to sub-pixel accuracy.

As another example, instead of scanning the FOV across a landmass, the CMSP sensor may also be utilized to scan a swath of sky while the CMSP sensor collects a series of image frames of multiple scenes of the sky along the swath that is scanned across the sky.

In this example, the CMSP sensor enables the formation of a time-series of spectral image cubes by processing each repeat of the spectral series separately. Differential processing techniques then provide for the detection of sub-pixel moving targets within a scene by detecting the number of pixels an object moves between the collection time associated with the first repeat and the second repeat as a function of ground sample distance (GSD).

In an example of operation, the CMSP sensor is typically located on a moving mobile platform and scans a scene that is remote from the CMSP sensor. If the mobile platform is, for example, a satellite, spacecraft, aircraft, or unmanned aerial vehicle, the scene is on the ground. If, instead, the CMSP sensor is fixed on the ground, the CMSP sensor may scan the sky with a gimbal type device or via electronic scanning.

In an example of operation, the CMSP sensor has a FOV and the FOV is swept across the scene on the ground from the air or space mobile platform in a "push-broom" type of mode while a sequence of image frames is collected from the scene. This sequence of image frames are raw image data that is processed to form images of a large region of the scene on the ground at many wavelengths of light and polarizations states. In this example, the CMSP sensor is configured to acquire this raw image data with the MSP filter that includes both the spectral and polarization filters. As a result, the CMSP sensor can produce image products for both spectral and polarization sensing modes simultaneously using only a single camera device such as a single FPA and a single optics device such as a telescope. As discussed earlier, this disclosure is not limited to imaging of landmasses on the Earth and can be applied to imaging of space objects including planets, asteroids, man-made space objects such as satellites and rocket bodies, and extra-solar objects.

It is appreciated by those of ordinary skill in the art that multi-spectral sensors (generally known as "spectral sensors") capture images at many wavelengths of light (where wavelength is inversely proportional to the frequency). Spectral sensors are an extension of red-green-blue cameras that include more in-between colors and may be able to also capture images at ultraviolet (UV) and various infrared (IR) wavelengths. In general, multi-spectral imaging is useful for many applications that include, for example, terrain classification, detecting specific materials (minerals, paints, metals, vehicles, roads, building materials, oil spills, soil types, etc.), characterizing the atmosphere, clouds, weather, and climate. Moreover, polarization imaging generally divides the received light into vertical, horizontal, ±45-degree polarization channels, and circular polarization channels. As discussed earlier, generally, man-made materials tend to polarize light much stronger than natural materials. As such, processing of the different polarization channels to produce a DOLP image will make any man-made objects "pop out" against the clutter background.

Unlike known approaches to produce both multi-spectral and polarization images, the CMSP sensor is less hardware complicated, utilizes less optics, and utilizes a single FPA for a single major spectral band (i.e. VNIR+SWIR, MWIR, and LWIR). With the CMSP sensor there is no need for separate cameras (one for multi-spectral image capture and another one for polarization image capture), an optical beam splitter to divide the received light from the collecting optics (i.e., a telescope), and a first set of focusing optics to direct the first portion of split light to a spectral imaging sensor on the first camera (i.e., first FPA) and a second set of focusing optics to direct the second portion of split light to a polarization imaging sensor on the second camera (i.e., a second FPA).

Turning to FIG. 1, a system block diagram of an example of an implementation of a CMSP sensor 100 is shown in accordance with the present disclosure. In this example, the CMSP sensor 100 is located on a mobile platform 102. The CMSP sensor 100 includes an MSP filter 104, a single FPA 106, and a controller 108 in signal communication with the MSP filter 104 and the single FPA 106. The MSP filter 104 includes at least a first bandpass filter having a first frequency range and a second bandpass filter having a second frequency range that is distinct from the first frequency range and a first polarization filter having a first polarization value and a second polarization filter having a second polarization value that is distinct from the first polarization value.

The FPA 106 includes a plurality of detectors 110 and the combination of the FPA 106, plurality of detectors, and MSP filter 104 forms a camera 112. The controller 108 is configured to initiate the capture of a first image of a scene 114 while a particular portion of the scene 114 has a first alignment with a first detector of the plurality of detectors 110 of the single FPA 106 and the first bandpass filter is between the particular portion of the scene 114 and the first detector. The controller 108 is also configured to initiate storage of a second image of the scene 114 in response to determining that the particular portion of the scene 114 has a second alignment with a second detector of the single FPA 106, the second alignment substantially matching the first alignment, and that the second bandpass filter is between the particular portion of the scene 114 and the second detector. The second image is captured while the particular portion of the scene has the second alignment with the second detector. Furthermore, the controller 108 is also configured to initiate storage of a third image of the scene 114 in response to determining that the particular portion of the scene 114 has a third alignment with a third detector of the single FPA 106, the third alignment substantially matching the first alignment, and that the first polarization filter is between the particular portion of the scene 114 and the third detector. The third image is captured while the particular portion of the scene 114 has the third alignment with the third detector. Moreover, the controller 108 is further configured to generate a multi-spectral and polarization composite image 116 using at least the first image, the second image, and third image.

The CMSP Sensor 100 may also include a telescope 118, an optical line of sight (LOS) measuring device 120, a motion device 122, a motion detector 124, and a storage 125. The LOS measuring device 120 may include an IMU. The motion device 122 is configured to physically move and direct the telescope 118 in a direction towards the scene 114, and the motion detector 124 is configured to measure the motion of the telescope 118. As an alternate or augmentation to the IMU, the system may also include image registration processing capability to estimate the relative pointing vector between images to sub-pixel precision.

In this example, the controller 108 is in signal communication with the FPA 106, detectors 110, telescope 118, LOS measuring device 120, motion device 122, and motion detector 124. The FPA 106 is also in signal communication with the motion device 122, motion detector 124, and storage 125. The storage 125 is a storage device such as a memory and is in signal communication with controller 108. In this example, the telescope 118 may be part of the camera 112 and it has a field of view (FOV) 126 that is directed towards the scene 114. Moreover, in this example, the scene 114 may have a target 128 (e.g., a particular portion 128 of the scene 114) that will be detected by the CMSP sensor 100.

It is appreciated by those of ordinary skill in the art that the circuits, components, modules, and/or devices of, or associated with, the CMSP Sensor 100 are described as being in signal communication with each other, where signal communication refers to any type of communication and/or connection between the circuits, components, modules, and/ or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats, without passing through a direct electromagnetic connection.

Figure 2:
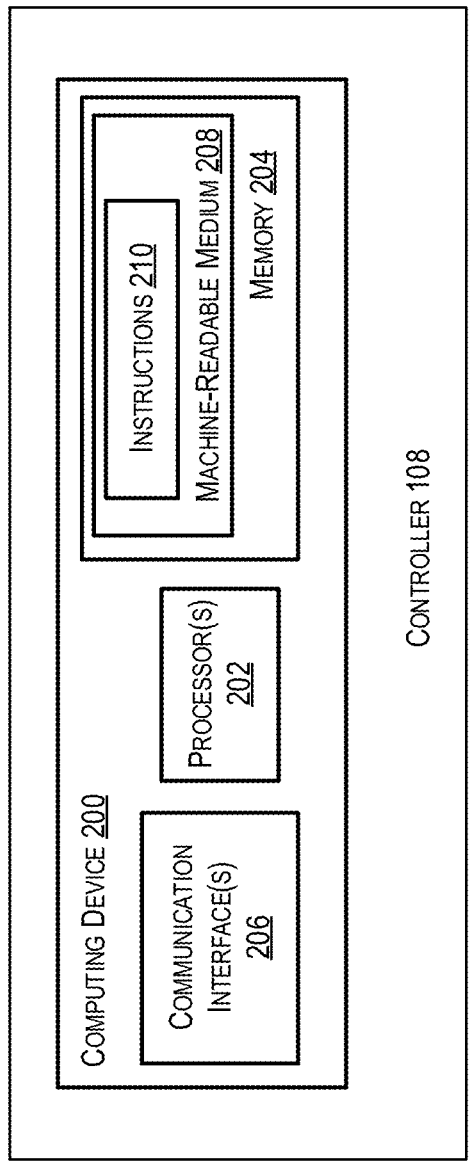
FIG. 2 is a system block diagram of an example of an implementation the controller is shown in accordance with the present disclosure.

In FIG. 2, a system block diagram of an example of an implementation the controller 108 is shown in accordance with the present disclosure. The controller 108 may include, or be part of, a computing device 200 that may include one or more processors 202, a memory 204, and one or more communication interfaces 206. The memory 204 may include a machine-readable medium 208 on the memory 204 that stores instructions 210 that, when executed by the computing device 200, cause the controller 108 to perform various operations.

In this example, the computing device 200 includes that one or more processors 202 that include, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory 204 to execute instructions to perform any of the various operations described in the present disclosure. The one or more processors 202 are adapted to interface and communicate with the memory 204 and other device (i.e., FPA 106, LOS measuring device 120, motion device 122, motion detector 124, and telescope 118) via the one or more communication interfaces 206 to perform method and processing steps as described herein. The one or more communication interfaces 206 include wired or wireless communication buses within the mobile platform 102.

In various examples, it is appreciated by those of ordinary skill in the art that the processing operations and/or instructions are integrated in software and/or hardware as part of the one or more processors 202, or code (e.g., software or configuration data), which is stored in the memory 204. The examples of processing operations and/or instructions 210 disclosed in the present disclosure are stored by the machine-readable medium 208 in a non-transitory manner (e.g., a memory 204, a hard drive, a compact disk, a digital video disk, or a flash memory) to be executed by the one or more processors 202 (e.g., a computer such as a logic or processor-based system) to perform various methods disclosed herein. In this example, the machine-readable medium 208 is shown as residing in memory 204 within the computing device 200 but it is appreciated by those of ordinary skill that the machine-readable medium 208 may be located on other memory external to the computing device 200. As another example, the machine-readable medium 208 may be included as part of the one or more processors 202.

In this example, the memory 204 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. The memory 204 may include one or more memory devices within the computing device 200 and/or one or more memory devices located external to the computing device 200. The one or more processors 202 are adapted to execute software (i.e., instructions 210) stored in the memory 204 to perform various methods, processes, and operations in a manner as described herein.

Figure 3:
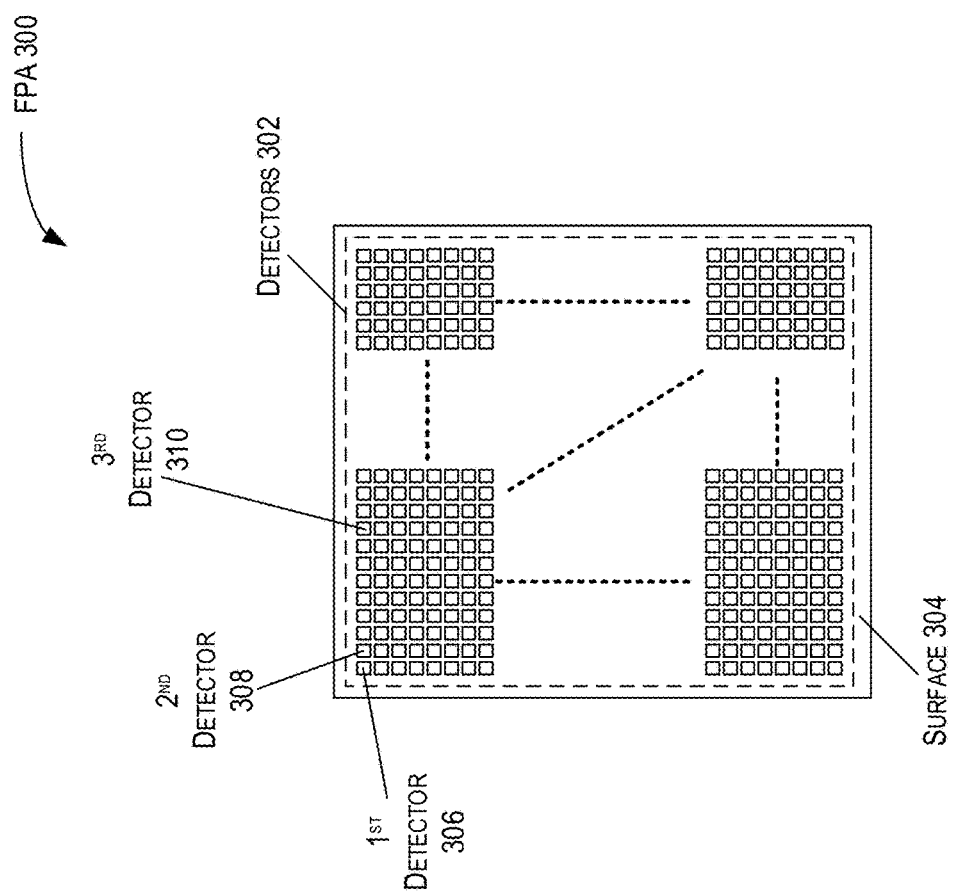
FIG. 3 is a top view of an example of an implementation of a focal plane array (FPA) shown in FIG. 1 in accordance with the present disclosure.

In FIG. 3, a top view of an example of an implementation of an FPA 300 is shown in accordance with the present disclosure. The FPA 300 includes a plurality of detectors 302 along the surface 304 of the FPA 300. In this example, for purposes of illustration, the FPA 300 is shown to have a first detector 306, second detector 308, and a third detector 310 along a first row of detectors at a first edge of the surface 304.

Figure 4:
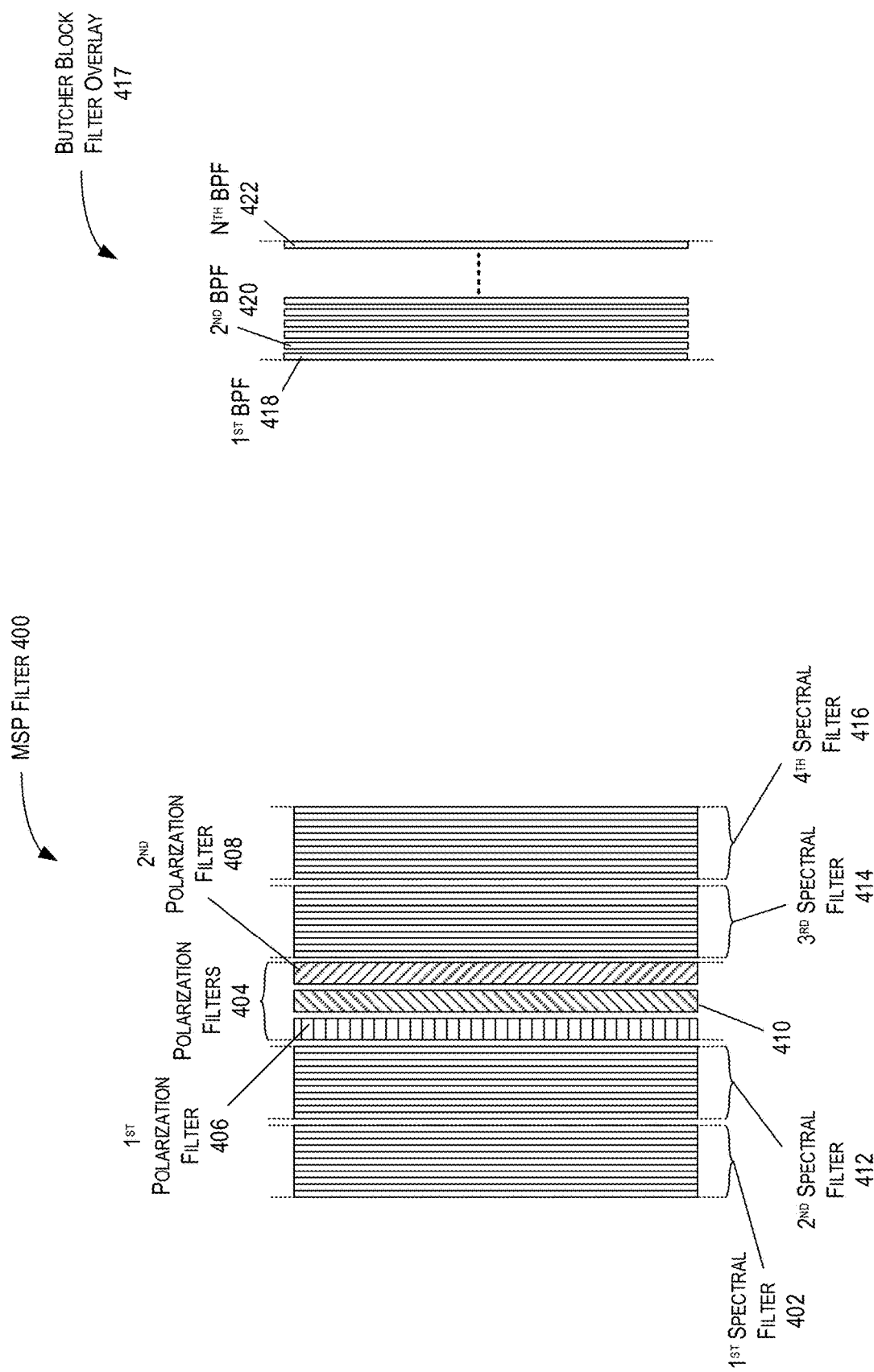
FIG. 4A is a top view of an example of an implementation of a multi-spectral and polarization (MSP) filter shown in accordance with the present disclosure.
FIG. 4B is a top view of an example of an implementation of a butcher block type of spectral filter of the MSP filter shown in FIG. 4A in accordance with the present disclosure.

In FIG. 4A, a top view of the implementation of the MSP filter 400 is shown in accordance with the present disclosure. In this example, the MSP filter 400 includes a butcher block type of spectral filter overlay 402 that comprises a plurality of bandpass filters that include at least a first bandpass filter and a second bandpass filter, where the bandpass filters of the plurality of bandpass filters have frequency ranges that vary from an infrared (IR) frequency to an ultraviolet frequency. The MSP filter 400 also includes a plurality of polarization filters 404 that include a first polarization filter 406, second polarization filter 408, and the third polarization filter 410, where the polarization filters of the plurality of polarization filters 404 have polarization ranges chosen from, as an example, a group consisting of vertical polarization, horizontal polarization, positive 45-degree polarization, and negative 45-degree polarization. In this example, the MSP filter 400 may include any number of butcher block filter overlays, for purposes of ease of illustration in this example the MSP filter 400 is shown as having four butcher block filter overlays illustrated as a first spectral filter 402, second spectral filter 412, third spectral filter 414, and four spectral filter 416.

Figure 5:
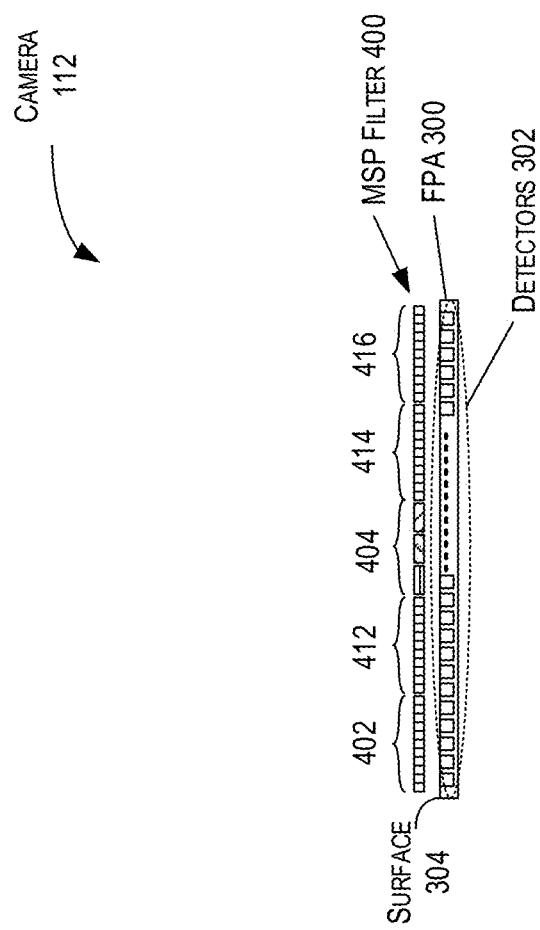
FIG. 5 is a side view of an example of an implementation of the FPA shown in FIG. 2A and the MSP filter shown in FIG. 4A in accordance with the present disclosure.

FIG. 4B is a top view of an example of an implementation of the butcher block type of spectral filter (i.e., butcher block filter overlay 417 that may be, for example, the first spectral filter 402, second spectral filter 412, third spectral filter 414, and four spectral filter 416) of the MSP filter 400 in accordance with the present disclosure. In this example, the butcher block filter overlay 402 may include a plurality of bandpass filters that include the first bandpass filter 418, the second bandpass filter 420, through an $N^{th}$ bandpass filter 422, where N may be equal to any number based on the design of the MSP filter 400. It is appreciated that for the purpose of illustration only four (4) spectral filters (i.e., a first spectral filter 402, second spectral filter 412, third spectral filter 414, and four spectral filter 416) are shown, however, based on the design of the MSP filter 400 there may be from two (2) to a large number of a set of spectral filters. In operation, these spectral filters may be repeated numerous times where a spectral image hypercube may be formed from each iteration of the utilization of a spectral filter or, alternatively, a single spectral image hypercube may be from all of the interactions. In this disclosure, by repeatably producing images of a scene to produce the spectral image hypercube, the CMSP sensor 100 is capable of detecting moving targets or images in the scene by subtracting the produced spectral images to determine what is different in spectral images of the scene. In FIG. 5, a side view of the FPA 300 and the MSP filter 104 is shown in accordance with the present disclosure.

In this example, the first frequency range is associated with a first color and the second frequency range is associated with a second color that is different from the first color. Additionally, the MSP filter 104, 400 includes a butcher block type of spectral filter 402, 412, 414, or 416 that includes the series of spectral filters and the series of polarization filters 404, where the bandpass filters of the series of spectral filters 402, 412, 414, or 416 have frequency ranges that vary from an infrared (IR) frequency to an ultraviolet frequency. Moreover, the polarization filters of the series of polarization filters 404 may have polarization ranges chosen from a group consisting of vertical polarization, horizontal polarization, positive 45-degree polarization, negative 45-degree polarization, other linear polarizations, right-hand circular polarization, and left-hand circular polarization.

Figure 6:
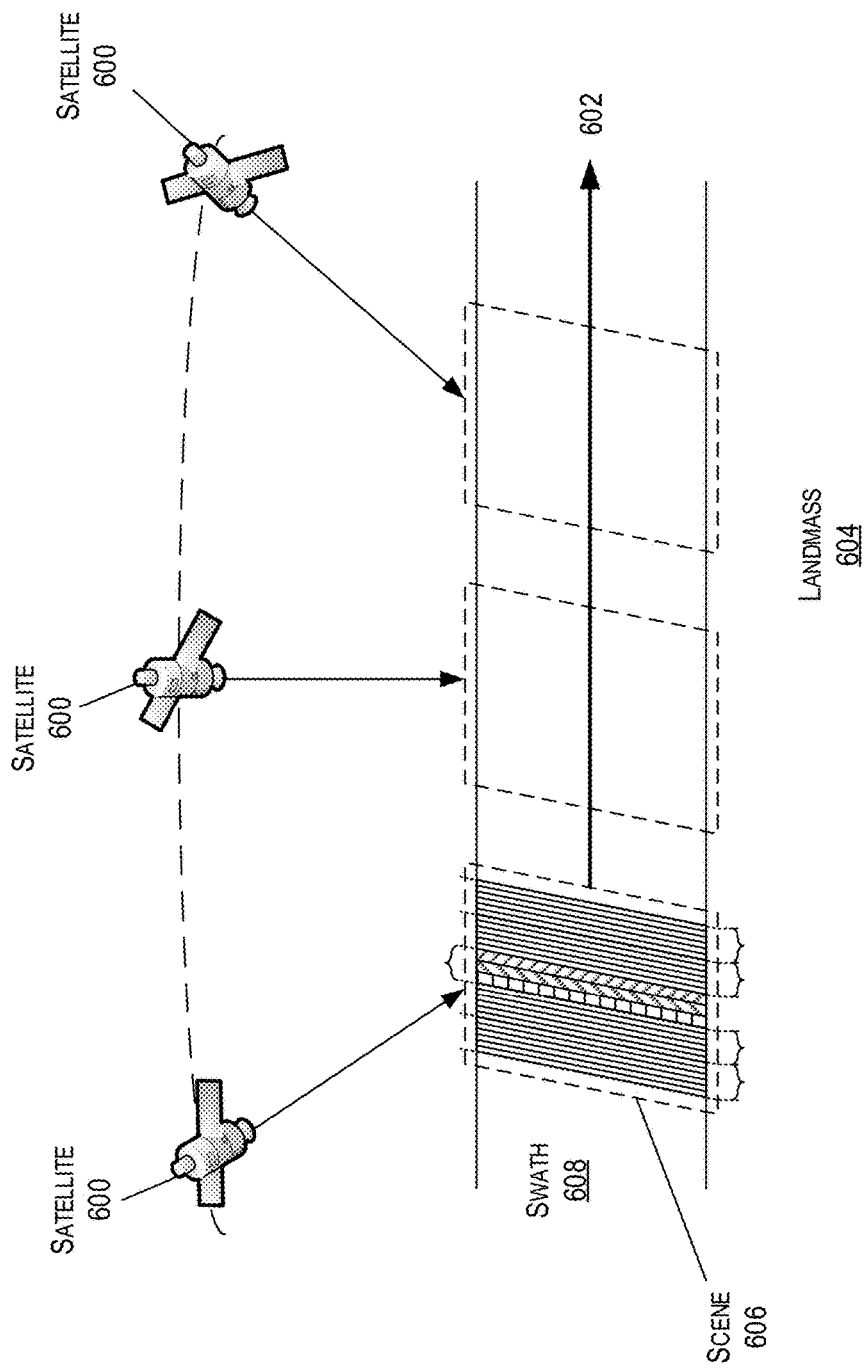
FIG. 6 is a system diagram of an example of operation of the CMSP sensor on a satellite in accordance with the present disclosure.

Turning to FIG. 6, a system diagram of an example of operation of the CMSP sensor 100 on a satellite 600 is shown in accordance with the present disclosure. The satellite 600 is an example of a moving mobile/vehicle platform on which the CMSP sensor 100 resides. In this example, the vehicle is shown as a satellite 600 but it is appreciated, as discussed earlier, that the vehicle may be, instead, an aerial vehicle such as, for example, a manned or unmanned aircraft, balloon, or other similar vehicle. The satellite 600 flies generally along a straight path 602 with a constant velocity and at a constant altitude over a landmass 604 observing a scene 606 along a swath 608 of the landmass 604. The CMSP sensor 100 is typically located on the satellite 600 and scans the scene 606 that is remote from the CMSP sensor 100 on the satellite 600. In an example of operation, the CMSP sensor 100 has a FOV 126 and the FOV 126 is swept across the scene 606 on the landmass 604 from the satellite 600 in a "push-broom" type of mode while a sequence of image frames is collected from the scene 606. Alternatively, instead of sweeping the FOV 126 across 606 on the landmass 604 in a push-broom type of mode, the LOS of the FOV 126 may be mechanically or electronically scanned across the landmass 604 (or across the sky) without moving the CMSP sensor 100. Moreover, the MSP filter 104 may be moved across the FPA 106.

As discussed earlier, this sequence of image frames are raw image data that is processed to form images of a large region of the scene 606 at many wavelengths of light and linear polarizations. As a result, the CMSP sensor 100 produces image products for both spectral and polarization sensing modes simultaneously using only a single camera device 112 that includes the single FPA 106 and a single optics device—i.e., telescope 118.

In this example, the FPA 300 of the CMSP sensor 100 may small (e.g., having approximately 256 detectors) to very large (e.g., having more 10K detectors). In this specific example, there may be 4,096 total detectors 302 in the FPA 300 of the CMSP sensor 100 divided into 15 spectral channels, where each spectral channel corresponds to a bandpass filter (i.e., 418 to 422) of the Butcher block filter overlay 402, 412, 414, or 416. Each spectral channel may span approximately 250-pixel columns of detectors 302 of the FPA 300.

In operation, each ground point in the scene 606 is measured N times at each pixel as the FOV 126 of the combination of the camera 112 and telescope 118 moves across the scene 606 and swath 608 at approximately 1 GSD for each exposure of the camera 112, where N is approximately equal to the number of pixels divided by the number of channels plus any buffers. The received image frames from the scene 606 are registered and co-added to build a hypercube (i.e., spectral image cube). In general, the co-adding of the received image frames increases the contrast to noise ratio (CNR) by a factor of the square root of N and suppresses any FPA 300 spatial non-uniformity residual noise. In addition, this process is repeated multiple times (for example three times) and three polarization measurements (for example, at 0 degrees, 45 degrees, and −45 degrees) are made on each ground point in the scene 606. As another example, the polarization measurements may be, alternatively, right-handed circular polarization and left-handed circular polarization.

Figure 7:
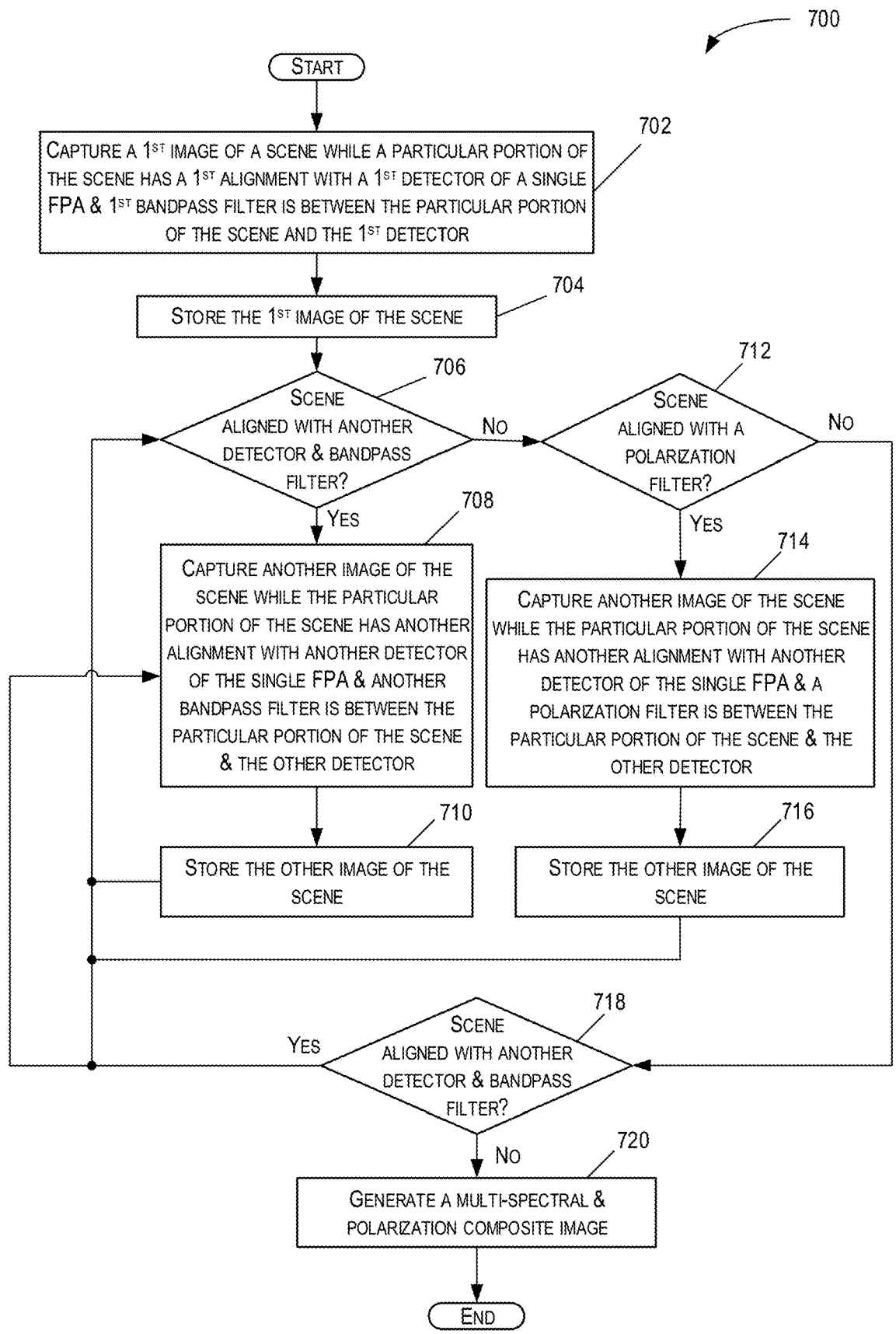
FIG. 7 is a flowchart of an example of a method of operation of the CMSP sensor shown in FIG. 1 in accordance with the present disclosure.

FIG. 7 is a flowchart of an example of a method 700 of operation of the CMSP sensor 100 in capturing image data in accordance with the present disclosure. The method includes capturing 702, with the CMSP sensor 100, a first image of a scene 114 or 606 while a particular portion of the scene 114 or 606 has a first alignment with a first detector 306 of the FPA 106, 300 and a first bandpass filter 418 is between the particular portion of the scene 114 or 606 and the first detector 306 and storing 704 the first image of the scene 114 or 606.

The method 700 then determines 706 whether the particular portion of the scene 114 or 606 is aligned with the second detector 308 and the second bandpass filter 420. In response to determining that the particular portion of the scene 114 or 606 has a second alignment with the second detector 308 of the single FPA 106, 300, the second alignment substantially matches the first alignment, and that the second bandpass filter 420 is between the particular portion of the scene 114 or 606 and the second detector 308, capturing 708 another (e.g., a second) image while the particular portion of the scene 114 or 606 has the second alignment with the second detector 308. The method 700 then stores 710 the second image of the scene 114 or 606. In this example, the second bandpass filter 420 has a second frequency range that is distinct from the first frequency range of the first bandpass filter 418. The method 700 then repeats step 706.

If, instead, the method 700 determines 706 that the particular portion of the scene 114 or 606 is not aligned with the second detector 308 and the second bandpass filter 420, the method 700 then determines 712 if the particular portion of the scene 114 or 606 has a third alignment with the third detector 310 of the single FPA 106, 300 and that a first polarization filter 406 is between the particular portion of the scene 114 or 606 and the third detector 310. If the particular portion of the scene 114 or 606 is aligned with the third detector 310 having the first polarization filter 406 between the particular portion of the scene 114 or 606 and the third detector 310, captures 714 another (e.g., a third) image of the scene 114 or 606 having the third alignment with the third detector 310. The method 700 then stores 716 the third image of the scene 114 or 606 and the method repeats step 706. If, instead, the method 700 determines 712 that the particular portion of the scene 114 or 606 does not have a third alignment with the third detector 310 of the single FPA 106, 300, the method 700 then determines 718 if the particular portion of the scene 114 or 606 has an alignment with another detector of the FPA 106, 300. If yes, the method 700 repeats step 706. If, no, the method 700 generates 720 a multi-spectral and polarization composite image 116 using at least the first, second, and third images and process ends.

In this example, the first frequency range is associated with a first color and the second frequency range is associated with a second color that is different from the first color.

Additionally, as discussed previously, the MSP filter 104 or 400 includes a butcher block type of spectral filter 402, 412, 414, or 416 that includes the series of spectral filters and the series of polarization filters 404, where the bandpass filters of the series of spectral filters 402, 412, 414, or 416 have frequency ranges that vary from an infrared (IR) frequency to an ultraviolet frequency. Moreover, the polarization filters of the series of polarization filters 404 may have polarization ranges chosen from a group consisting of vertical polarization, horizontal polarization, positive 45-degree polarization, negative 45-degree polarization, additional linear orientations, or optionally left-hand or right-hand circular polarizations.

The method 700 may further include adjusting one or more component(s) of the CMSP sensor 100 to generate the second alignment of the particular portion of the scene 114, 606 with the second detector 308.

Figure 8A:
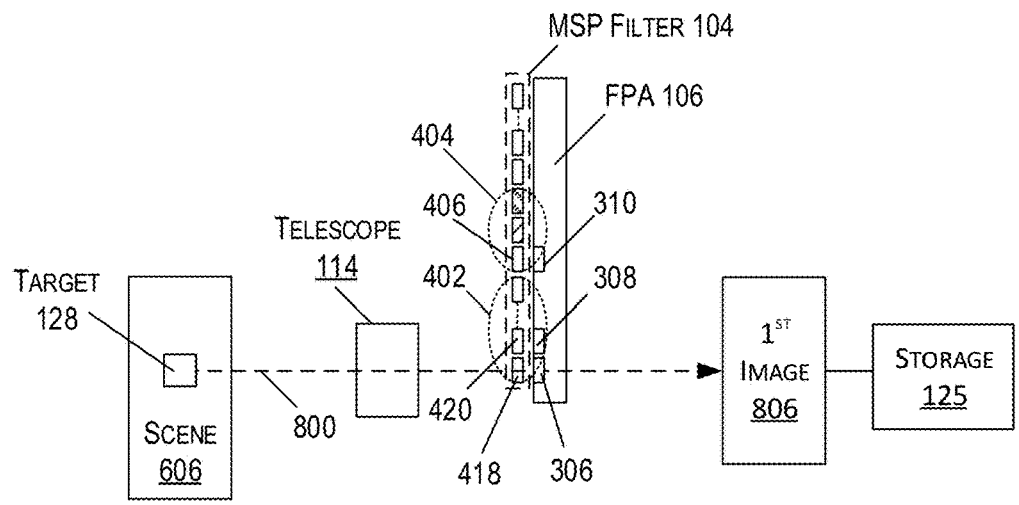
FIG. 8A is a system block diagram of an example of a first alignment between a target in the scene and a first detector of the FPA shown in FIG. 3 in accordance with the present disclosure.
Figure 8B:
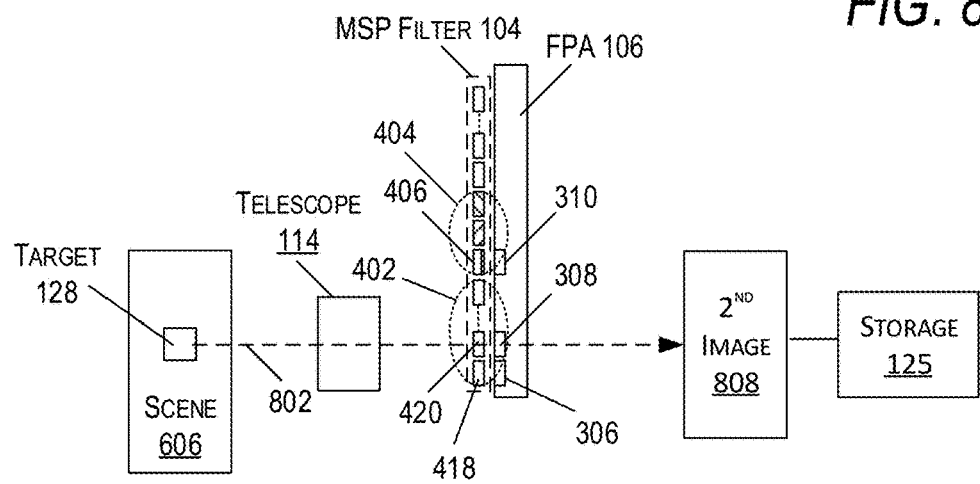
FIG. 8B is a system block diagram of an example of a second alignment between the target in the scene and a second detector of the FPA shown in FIG. 3 in accordance with the present disclosure.
Figure 8C:
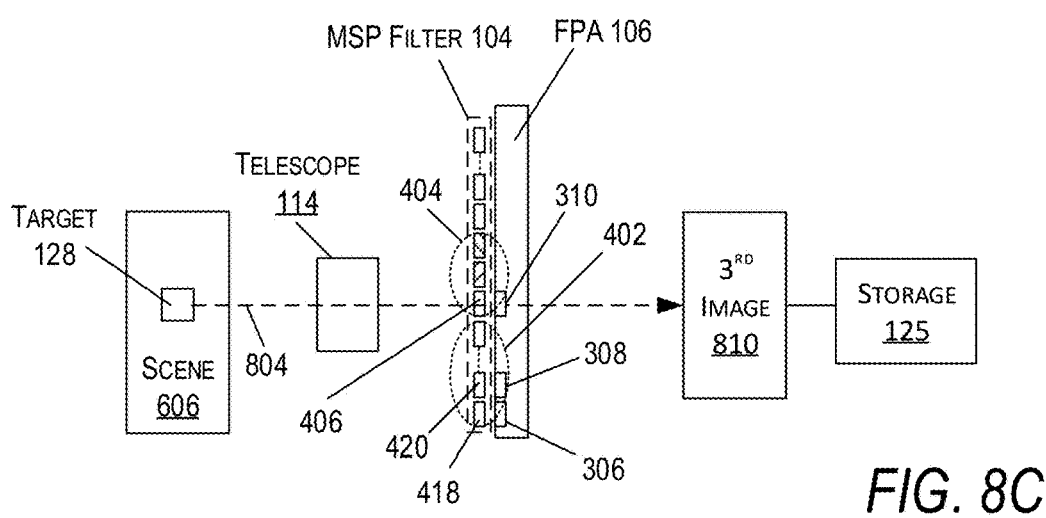
FIG. 8C is a system block diagram of an example of a third alignment between the target in the scene and a third detector of the FPA shown in FIG. 3 in accordance with the present disclosure.

Turning to FIG. 8A, a system block diagram of an example of a first alignment 800 between a target 128 in the scene 606 and the first detector 306 of the FPA 300 is shown in accordance with the present disclosure. In FIG. 8B, a second alignment 802 is shown between the target 128 and the second detector 308 in accordance with the present disclosure. In FIG. 8C, a third alignment 804 is shown between the target 128 and the third detector 310 in accordance with the present disclosure. In this first example shown in FIG. 8A, the target 128 is aligned with the first detector 306 and first bandpass filter 418 and the CMSP sensor 100 produces the first image 806 and stores it in the storage 125. In the second example shown in FIG. 8B, the target 128 is aligned with the second detector 308 and second bandpass filter 420 and the CMSP sensor 100 produces the second image 808 and stores it in the storage 125. Moreover, in the third example shown in FIG. 8C, the target 128 is aligned with the third detector 310 and the first polarization filter 406 and the CMSP sensor 100 produces the third image 810 and stores it in the storage 125. Once the third image 810 is stored, the CMSP sensor 100 may produce a basic composite image 116. Generally, it is appreciated that the CMSP sensor 100 will repeat this process for all of the pixel columns in the FPA 106 before producing a high-quality composite image 116.

In this example, the MSP filter 104 was described as moving on mobile platform, such as the satellite 600, over the scene 606, where the first image 806, second image 808, and the third image 810 are produced as the MSP filter 104 moves along the swath 608 utilizing a push-broom type of mode. However, the CMSP sensor 100 may alternatively use a scanning type of mode of operation where the camera 112 scans the swath 608 either mechanically or electronically. Moreover, the CMSP sensor 100 may be on a non-moving platform that also utilizes a scanning type of mode of operation where the camera 112 scans the swath 608 of the landmass 604 or the sky either mechanically or electronically. In these scanning examples, the CMSP sensor 100 produces the first image 806 by aiming the camera 112 (or just the FPA 106) to a first position directed towards the scene 606 and produces the second image 808 by aiming the FPA 106 to a second position directed towards the scene 606. The process may be repeated for numerous aiming angles directed towards the scene 606 and producing numerous images from the scene.

Moreover, in this example, the MSP filter 104 is described as being fixed on the FPA 106 as the FPA 106 receives the image data (such as electromagnetic energy) from the scene 606 to produces the first image 806, second image 808, and third image 810; however, the CMSP sensor 100 may alternatively shift the position of the MSP filter 104 along the FPA 106 so as to have different individual bandpass filters or polarization filters aligned between the scene 606 and specific detectors of the FPA 106.

As an example, the first detector 306 may initially be at the first alignment 800 that corresponds to the first bandpass filter 418 being between the particular portion (i.e., target 128) of the scene 606 and the first detector 306. However, in this example in the second alignment, the first bandpass filter 418 shifts off of the first detector 306 and the second bandpass filter 420 shifts on to the first detector 306 such that the second alignment corresponds to the first alignment 800 but in this case the second bandpass filter 420 is between the particular portion 128 of the scene 606 and the first detector 306.

Further, the disclosure comprises embodiments according to the following clauses.

Clause 1. A CMSP sensor 100 comprising: a camera 112 having a single FPA 106 comprising a plurality of detectors 110, 302; a MSP filter 104, 400 comprising a series of spectral filters 402 and a series of polarization filters 404, wherein the series of spectral filters 402 comprise at least a first bandpass filter 418 having a first frequency range and a second bandpass filter 420 having a second frequency range that is distinct from the first frequency range and the series of polarization filters 404 comprise at least a first polarization filter 406 having a first polarization value and a second polarization filter having a second polarization value that is distinct from the first polarization value; and a controller 108 in signal communication with the MSP filter 104, 400 and the single FPA 106, 300, the controller 108 configured to initiate capture 702 of a first image 806 of a scene 114, 606 while a particular portion 128 of the scene 114, 606 has a first alignment 800 with a first detector 306 of the single FPA 106, 300 and the first bandpass filter 418 is between the particular portion 128 of the scene 114, 606 and the first detector 306, in response to determining 706 that the particular portion of the scene 114, 606 has a second alignment 802 with a second detector 308 of the single FPA 106, 300, the second alignment 802 substantially matching the first alignment 800), and that the second bandpass filter 420 is between the particular portion 128 of the scene 114, 606 and the second detector 308, initiate storage 710 of a second image 808 of the scene 114, 606, the second image 808 captured while the particular portion of the scene 114, 606 has the second alignment 802 with the second detector 308, in response to determining 712 that the particular portion 128 of the scene 114, 606 has a third alignment 804 with a third detector 310 of the single FPA 106, 300, the third alignment 804 substantially matching the first alignment 800, and that the first polarization filter 406 is between the particular portion 128 of the scene 114, 606 and the third detector 310, initiate storage 716 of a third image 810 of the scene 114, 606, the third image 810 captured while the particular portion 128 of the scene 114, 606 has the third alignment 804 with the third detector 310, and generate 720 a multi-spectral and polarization composite image 116 using at least the first image 806, the second image 808, and third image 810, wherein the first image 806, the second image 808, and third image 810 are co-added to build the multi-spectral and polarization composite image 116 as a hypercube image, wherein co-adding the first image 806, the second image 808, and third image 810 increases the CNR of the multi-spectral and polarization composite image 116.

Clause 2. The CMSP sensor 100 of clause 1, wherein the first frequency range is associated with a first color and the second frequency range is associated with a second color that is different from the first color.

Clause 3. The CMSP sensor 100 of clause 2, wherein the MSP filter 104, 400 includes a butcher block type of spectral filter 402 that includes the series of spectral filters and the series of polarization filters 404, wherein the bandpass filters of the series of spectral filters have frequency ranges that vary from an infrared (IR) frequency to an ultraviolet frequency.

Clause 4. The CMSP sensor 100 of clause 3, wherein the polarization filters of the series of polarization filters 404 have polarization ranges chosen from a group consisting of vertical polarization, horizontal polarization, positive 45-degree polarization, negative 45-degree polarization, other optional linear polarization angles, left-hand circular polarization, and right-hand circular polarization.

Clause 5. The CMSP sensor 100 of clause 1, wherein the controller is further configured to cause a position of one or more component(s) of the CMSP sensor to be adjusted to generate the second alignment of the particular portion of the scene with the second detector.

Clause 6. The CMSP sensor 100 of clause 5, wherein the MSP filter comprises a filter array, wherein the controller is configured to cause the position of the one or more component of the CMSP sensor to be adjusted by shifting a position of the filter array based on a physical dimension of the first bandpass filter, and wherein the first detector and the second detector are the same detector.

Clause 7. The CMSP sensor of clause 1, further including a telescope 118 in signal communication with the MSP filter and the controller.

Clause 8. The CMSP sensor 100 of clause 7, further including an optical line of sight (LOS) measuring device 120 configured to generate optical sensor line-of-sight movement data.

Clause 9. The CMSP sensor 100 of clause 8, wherein the LOS measuring device includes an inertial measurement unit (IMU).

Clause 10. The CMSP sensor 100 of clause 7, wherein the CMSP sensor further comprises a motion device 122 configured to physically move and direct the telescope in a direction towards the scene and a motion detector 124 configured to measure the motion of the telescope.

Clause 11. The CMSP sensor 100 of clause 10, wherein the CMSP sensor 100 produces the first image 806 by aiming the FPA 106 to a first position directed towards the scene 606 and produces the second image 808 by aiming the FPA 106 to a second position directed towards the scene 606.

Clause 12. The CMSP sensor 100 of clause 1, wherein the second detector is the first detector 306 and the second alignment corresponds to the first alignment 800 where the second bandpass filter 420 is between the particular portion 128 of the scene 114, 606 and the first detector 306, wherein the first bandpass filter 418 has shifted off of the first detector 306 and the second bandpass filter 420 has shifted on to the first detector 306.

Clause 13. The CMSP sensor 100 of clause 1 wherein the first image 806, the second image 808, and the third image 810 are registered to produce the first alignment 800, second alignment 802, and third alignment 804.

Clause 14. The CMSP sensor 100 of clause 1, wherein the CMSP sensor is configured on a mobile platform 102 chosen from a group consisting of a satellite, spacecraft, aircraft, unmanned aerial vehicle, and maritime vessel.

Clause 15. A CMSP sensor 100 comprising: an MSP filter 104 comprising at least a first bandpass filter 418 having a first frequency range and a second bandpass filter 420 having a second frequency range that is distinct from the first frequency range and a first polarization filter 406 having a first polarization value and a second polarization filter 408 having a second polarization value that is distinct from the first polarization value; an FPA 106 comprising a plurality of detectors 110; and a controller 108 in signal communication with the MSP filter 104 and the single FPA 106, the controller 108 configured to initiate capture 702 of a first image 806 of a scene 114, 606 while a particular portion 128 of the scene 114, 606 has a first alignment 800 with a first detector 306 of the single FPA 106, 300 and the first bandpass filter 418 is between the particular portion 128 of the scene 114, 606 and the first detector 306, in response to determining 706 that the particular portion of the scene 114, 606 has a second alignment 802 with a second detector 308 of the single FPA 106, 300, the second alignment 802 substantially matching the first alignment 800), and that the second bandpass filter 420 is between the particular portion 128 of the scene 114, 606 and the second detector 308, initiate storage 710 of a second image 808 of the scene 114, 606, the second image 808 captured while the particular portion of the scene 114, 606 has the second alignment 802 with the second detector 308, in response to determining 712 that the particular portion 128 of the scene 114, 606 has a third alignment 804 with a third detector 310 of the single FPA 106, 300, the third alignment 804 substantially matching the first alignment 800, and that the first polarization filter 406 is between the particular portion 128 of the scene 114, 606 and the third detector 310, initiate storage 716 of a third image 810 of the scene 114, 606, the third image 810 captured while the particular portion 128 of the scene 114, 606 has the third alignment 804 with the third detector 310, and generate 720 a multi-spectral and polarization composite image 116 using at least the first image 806, the second image 808, and third image 810, wherein the first image 806, the second image 808, and third image 810 are co-added to build the multi-spectral and polarization composite image 116 as a hypercube image, wherein co-adding the first image 806, the second image 808, and third image 810 increases the CNR of the multi-spectral and polarization composite image 116.

Clause 16. The CMSP sensor 100 of clause 15, wherein the controller 108 comprises: a memory 204; one or more processing processors 202; and a machine-readable medium 208 on the memory 204, wherein the machine-readable medium 208 stores instructions 210 that, when executed by the one or more processors 202, cause the controller 108 to perform operations comprising the capture of the first image 806, the second image 808, and third image 810, and generate the multi-spectral and polarization composite image 116.

Clause 17. The CMSP sensor 100 of clause 15, wherein the first frequency range is associated with a first color and the second frequency range is associated with a second color that is different from the first color.

Clause 18. The CMSP sensor 100 of clause 17, wherein the MSP filter 104, 400 includes a butcher block type of spectral filter 402 that includes the series of spectral filters and a series of polarization filters 404, wherein the bandpass filters of the series of spectral filters have frequency ranges that vary from an infrared (IR) frequency to an ultraviolet frequency.

Clause 19. The CMSP sensor 100 of clause 18, wherein the polarization filters of the series of polarization filters 404 have polarization ranges chosen from a group consisting of vertical polarization, horizontal polarization, positive 45-degree polarization, negative 45-degree polarization, other optional linear polarization angles, left-hand circular polarization, and right-hand circular polarization.

Clause 20. The CMSP sensor 100 of clause 15, wherein the controller is further configured to cause a position of one or more component(s) of the CMSP sensor to be adjusted to generate the second alignment of the particular portion of the scene with the second detector.

Clause 21. The CMSP sensor 100 of clause 20, wherein the MSP filter comprises a filter array, wherein the controller is configured to cause the position of the one or more component of the CMSP sensor to be adjusted by shifting a position of the filter array based on a physical dimension of the first bandpass filter, and wherein the first detector and the second detector are the same detector.

Clause 22. The CMSP sensor of clause 15, further including a telescope 118 in signal communication with the MSP filter and the controller.

Clause 23. The CMSP 100 sensor of clause 22, further including an optical line of sight (LOS) measuring device 120 configured to generate optical sensor line-of-sight movement data.

Clause 24. The CMSP sensor 100 of clause 23, wherein the LOS measuring device includes an inertial measurement unit (IMU).

Clause 25. The CMSP sensor 100 of clause 15, wherein the CMSP sensor further comprises a motion device 122 configured to physically move and direct the telescope in a direction towards the sense and a motion detector 124 configured to measure the motion of the telescope.

Clause 26. The CMSP sensor 100 of clause 15, wherein the CMSP sensor is configured on a mobile platform 102 chosen from a group consisting of a satellite, spacecraft, aircraft, unmanned aerial vehicle, and maritime vessel.

Clause 27. A method 700 of capturing image data, the method 700 comprising: capturing, with a CMSP sensor 100, a first image 806 of a scene 114, 606 while a particular portion 128 of the scene 114, 606 has a first alignment 800 with a first detector 306 of a FPA 106, 300 and a first bandpass filter 418 is between the particular portion 128 of the scene 114, 606 and the first detector 306; in response to determining 706 that the particular portion of the scene 114, 606 has a second alignment 802 with a second detector 308 of the single FPA 106, 300, the second alignment 802 substantially matching the first alignment 800), and that the second bandpass filter 420 is between the particular portion 128 of the scene 114, 606 and the second detector 308, initiate storage 710 of a second image 808 of the scene 114, 606, the second image 808 captured while the particular portion of the scene 114, 606 has the second alignment 802 with the second detector 308; in response to determining 712 that the particular portion 128 of the scene 114, 606 has a third alignment 804 with a third detector 310 of the single FPA 106, 300, the third alignment 804 substantially matching the first alignment 800, and that the first polarization filter 406 is between the particular portion 128 of the scene 114, 606 and the third detector 310, initiate storage 716 of a third image 810 of the scene 114, 606, the third image 810 captured while the particular portion 128 of the scene 114, 606 has the third alignment 804 with the third detector 310; and generate 720 a multi-spectral and polarization composite image 116 using at least the first image 806, the second image 808, and third image 810, wherein the first image 806, the second image 808, and third image 810 are co-added to build the multi-spectral and polarization composite image 116 as a hypercube image, wherein co-adding the first image 806, the second image 808, and third image 810 increases the CNR of the multi-spectral and polarization composite image 116.

Clause 28. The method 700 of clause 27, wherein the first frequency range is associated with a first color and the second frequency range is associated with a second color that is different from the first color.

Clause 29. The method 700 of clause 28, wherein the MSP filter 104, 400 includes a butcher block type of spectral filter 402 that includes a series of spectral filters and a series of polarization filters 404, wherein the bandpass filters of the series of spectral filters have frequency ranges that vary from an infrared (IR) frequency to an ultraviolet frequency.

Clause 30. The method 700 of clause 29, wherein the polarization filters of the series of polarization filters 404 have polarization ranges chosen from a group consisting of vertical polarization, horizontal polarization, positive 45-degree polarization, and negative 45-degree polarization.

Clause 31. The method 700 of clause 27, further including adjusting one or more component(s) of the CMSP sensor 100 to generate the second alignment of the particular portion of the scene 114, 606 with the second detector 308.

Clause 32. The method 700 of clause 27, wherein the second detector is the first detector 306 and the second alignment corresponds to the first alignment 800 where the second bandpass filter 420 is between the particular portion 128 of the scene 114, 606 and the first detector 306, wherein the first bandpass filter 418 has shifted off of the first detector 306 and the second bandpass filter 420 has shifted on to the first detector 306.

Clause 33. The method 700 of clause 27 wherein the first image 806, the second image 808, and the third image 810 are registered to produce the first alignment 800, second alignment 802, and third alignment 804.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z,"

unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

What is claimed is:

1. A combined multi-spectral and polarization (CMSP) sensor comprising:
   a Focal Plane Array (FPA) comprising a plurality of detectors positioned along an FPA surface;
   a multi-spectral and polarization (MSP) filter overlaying the detectors and the FPA surface, the MSP filter comprising a plurality of constituent filters each of which is a bandpass filter or a polarization filter, wherein at least two of the constituent filters are bandpass filters having respective different frequency ranges, and at least two other of the constituent filters are polarization filters having respective different polarization values;
   a controller configured to cause the detectors to capture a plurality of images of scenes sharing a scene portion whose image is captured in two or more of the images through respective two or more of the constituent filters, the two or more of the constituent filters being different from each other with respect to frequency range and/or polarization value; and
   an alignment measuring device configured to determine whether the scene portion is aligned with one of the detectors while one of the constituent filters is positioned between the scene portion and the one of the detectors aligned with the scene portion;
   wherein the controller is configured to:
   use the alignment measuring device to determine that the scene portion is aligned with one of the detectors while one of the constituent filters is positioned between the scene portion and the one of the detectors aligned with the scene portion; and
   in response to determining that the scene portion is aligned, cause the plurality of the detectors to capture one of the plurality of images such that the one of the detectors aligned with the scene portion captures the image of the scene portion through the one of the constituent filters positioned between the scene portion and the one of the detectors aligned with the scene portion;
   wherein each point of the FPA surface is overlaid by at most one of the constituent filters.

2. The CMSP sensor of claim 1, wherein each of the detectors is overlaid by at most one of the constituent filters.

3. The CMSP sensor of claim 1, wherein each of the detectors is configured to detect light passing through at most one of the constituent filters.

4. The CMSP sensor of claim 1, wherein the alignment measuring device comprises an inertial measurement unit.

5. The CMSP sensor of claim 1, wherein the controller is configured to cause images of the scene portion to be consecutively captured by different detectors of the FPA through respective different constituent filters of the MSP in response to the alignment measuring device consecutively determining that the scene portion becomes aligned with the respective different detectors.

6. The CMSP sensor of claim 1, wherein causing the detectors to capture the plurality of images comprises scanning the scenes by the CMSP sensor installed on a non-moving platform.

7. The CMSP sensor of claim 1, wherein the controller is configured to cause the detectors to capture the plurality of images when the CMSP sensor is installed on a moving platform which is at least one of a satellite, spacecraft, aircraft, and/or unmanned aerial vehicle.

8. A combined multi-spectral and polarization (CMSP) sensor comprising:
   a plurality of detectors;
   a multi-spectral and polarization (MSP) filter overlaying the detectors, the MSP filter comprising a plurality of constituent filters each of which is a bandpass filter or a polarization filter, wherein at least two of the constituent filters are bandpass filters having respective different frequency ranges, and at least two other of the constituent filters are polarization filters having respective different polarization values;
   a controller configured to cause the detectors to capture a plurality of images of scenes sharing a scene portion whose image is captured in two or more of the images through respective two or more of the constituent filters, the two or more of the constituent filters being different from each other with respect to frequency range and/or polarization value; and
   an optical line of sight (LOS) measuring device configured to determine whether the scene portion is aligned with one of the detectors while one of the constituent filters is positioned between the scene portion and the one of the detectors aligned with the scene portion;
   wherein the controller is configured to:
   use the LOS measuring device to determine that the scene portion is aligned with one of the detectors while one of the constituent filters is positioned between the scene portion and the one of the detectors aligned with the scene portion; and in response to determining that the scene portion is aligned, cause the plurality of the detectors to capture one of the plurality of images such that the one of the detectors aligned with the scene portion captures the image of the scene portion through the one of the constituent filters positioned between the scene portion and the one of the detectors aligned with the scene portion;

wherein each of the detectors is configured to detect light passing through at most one of the constituent filters.

9. The CMSP sensor of claim 8, wherein each of the detectors is overlaid by at most one of the constituent filters.

10. The CMSP sensor of claim 8 wherein the LOS measuring device comprises an inertial measurement unit.

11. The CMSP sensor of claim 8, wherein the controller is configured to cause images of the scene portion to be consecutively captured by different detectors through respective different constituent filters of the MSP in response to the LOS measuring device consecutively determining that the scene portion becomes aligned with the respective different detectors.

12. The CMSP sensor of claim 8, wherein causing the detectors to capture the plurality of images comprises scanning the scenes by the CMSP sensor installed on a non-moving platform.

13. The CMSP sensor of claim 8, wherein the controller is configured to cause the detectors to capture the plurality of images when the CMSP sensor is installed on a moving platform which is at least one of a satellite, spacecraft, aircraft, and/or unmanned aerial vehicle.

14. A combined multi-spectral and polarization (CMSP) sensor comprising:
   a plurality of detectors;
   a combined filter comprising a plurality of constituent filters having respective different spectral or polarization properties, each constituent filter overlaying a corresponding one of the detectors;
   a controller configured to cause the detectors to capture a plurality of images of scenes sharing a scene portion whose image is captured in each of the plurality of images through a respective different one of the constituent filters; and
   an alignment measuring device configured to determine whether the scene portion is aligned with one of the detectors while one of the constituent filters is positioned between the scene portion and the one of the detectors aligned with the scene portion;

wherein the controller is configured to:
   use the alignment measuring device to determine that the scene portion is aligned with one of the detectors while one of the constituent filters is positioned between the scene portion and the one of the detectors aligned with the scene portion; and
   in response to determining that the scene portion is aligned, cause the plurality of the detectors to capture one of the plurality of images such that the one of the detectors aligned with the scene portion captures the image of the scene portion through the one of the constituent filters positioned between the scene portion and the one of the detectors aligned with the scene portion.

15. The CMSP sensor of claim 14, wherein each constituent filter is a spectral filter or a polarization filter.

16. The CMSP sensor of claim 14, wherein the alignment measuring device comprises an inertial measurement unit.

17. The CMSP sensor of claim 14 wherein:
   at least one of the detectors is configured to detect light passing through one of the constituent filters which is a spectral filter; and
   at least another one of the detectors is configured to detect light passing through another one of the constituent filters which is a polarization filter.

18. The CMSP sensor of claim 14, wherein causing the detectors to capture the plurality of images comprises scanning the scenes by the CMSP sensor installed on a non-moving platform.

19. The CMSP sensor of claim 14, wherein the controller is configured to cause the detectors to capture the plurality of images when the CMSP sensor is installed on a moving platform which is at least one of a satellite, spacecraft, aircraft, and/or unmanned aerial vehicle.

20. The CMSP sensor of claim 19, wherein each of the scenes comprises at least one portion whose image is captured in two or more of the images through respective two or more of the constituent filters having respective different spectral or polarization properties.

* * * * *